United States Patent
Komatsu et al.

(10) Patent No.: US 6,300,999 B1
(45) Date of Patent: Oct. 9, 2001

(54) OPTICAL APPARATUS

(75) Inventors: Akio Komatsu, Gamagori; Yutaka Mizukusa, Hamamatsu, both of (JP)

(73) Assignee: Kowa Company Ltd. (JP)

( * ) Notice: Subject to any disclaimer, the term of this patent is extended or adjusted under 35 U.S.C. 154(b) by 0 days.

(21) Appl. No.: 09/420,173

(22) Filed: Oct. 18, 1999

(30) Foreign Application Priority Data

Oct. 19, 1998 (JP) .................................................. 10-296268
Sep. 22, 1999 (JP) .................................................. 11-267923

(51) Int. Cl.$^7$ .......................... G03B 13/24; G03B 27/52; G03B 15/00
(52) U.S. Cl. .................................... 355/44; 355/40; 396/1
(58) Field of Search ........................ 396/1–3; 355/27–29, 355/40–44; 348/586–587, 592, 373; 352/70

(56) References Cited

U.S. PATENT DOCUMENTS

| | | | |
|---|---|---|---|
| 4,341,452 | * 7/1982 | Korling | 354/293 |
| 4,837,632 | * 6/1989 | Kubo et al. | 358/222 |
| 5,092,670 | * 3/1992 | Preston | 352/140 |
| 5,262,815 | * 11/1993 | Aumiller | 354/290 |
| 5,587,740 | * 12/1996 | Brennan | 348/373 |
| 5,594,514 | * 1/1997 | Klees | 396/429 |
| 5,923,406 | * 11/1999 | Brasington et al. | 355/40 |
| 5,930,528 | * 7/1999 | Ito et al. | 396/2 |
| 5,986,718 | * 11/1999 | Barwacz et al. | 348/592 |
| 6,021,417 | * 2/2000 | Massarksy | 707/502 |
| 6,072,537 | * 6/2000 | Gurner et al. | 348/586 |

* cited by examiner

Primary Examiner—David M. Gray
Assistant Examiner—Hung Henry Nguyen
(74) Attorney, Agent, or Firm—Adams & Wilks

(57) ABSTRACT

An optical apparatus is provided with storage means for storing captured images taken beforehand within a range of directional variability of an optical imaging system. The direction of the optical imaging system is detected and an image obtained in the detected direction is read from the storage means and displayed in place of an image actually being taken by the optical imaging system. When the scene desired to be viewed is not clearly visible or hard to find owing to cloudiness or the like, the user can view a corresponding simulated scene and, based on the simulated scene, can quickly find and view the actual scene. The real or simulated scene can be displayed for a predetermined period of time in response to insertion of a coin.

18 Claims, 4 Drawing Sheets

OPTICAL APPARATUS

BACKGROUND OF THE INVENTION

1. Field of the Invention

The present invention relates to an optical apparatus, and more particularly to an optical apparatus for installation at a tourist attraction, scenic spot or the like.

2. Description of the Prior Art

Binoculars and telescopes usable for a certain period of time upon insertion of a coin are typical of conventional optical apparatus. One drawback of optical apparatus of this type is that they are designed to be used by only one person at a time. Two or more persons cannot share a view simultaneously. The fact that the optical apparatus are equipped with binoculars or a telescope of fixed magnification causes further problems. When the magnification is set high, as is often the case, the field of view is so narrow that the target is easily lost from sight, and the user (viewer) has considerable trouble finding it again. The high magnification also makes the apparatus impossible to use for anything other than observing distant scenes.

Recently, there has also been developed a video telescopic system utilizing a CCD (charged-coupled device) camera. These optical apparatus are usually installed at scenic spots frequented by tourists and are ordinarily operated by persons not familiar with the local scenery and not used to using this type of optical apparatus.

The typical user therefore frequently needs considerable time to bring the desired scene or object into view and, when using the optical apparatus at night or during bad weather, may not even be able make out what is being observed.

SUMMARY OF THE INVENTION

An object of the present invention is to overcome the foregoing drawbacks of the prior art by providing an optical apparatus that permits two or more persons to view a scene simultaneously.

Another object of the present invention is to provide an optical apparatus that permits the magnification of a scene being viewed by two or more persons to be varied simply as desired.

A further object of the present invention is to provide an optical apparatus that enables display of a simulated image corresponding to the image being obtained by the optical apparatus.

An optical apparatus according to one aspect of the present invention comprises an optical imaging system, an image pickup device for capturing an image focused by the optical imaging system, a display device for displaying the captured image, and means responsive to insertion of a coin for outputting and displaying the captured image on the display device for a predetermined period of time.

An optical apparatus according to the present invention is preferably provided with a system for zooming the optical imaging system. The zooming system is constructed to be operable from outside for desired magnification of the displayed image.

An optical apparatus according to the present invention is preferably further provided with a demonstration image display system for displaying a predetermined image on the display device until a coin is inserted.

An optical apparatus according to the present invention is preferably further provided with a printer for printing an image displayed on the display device.

In the optical apparatus according to the present invention, scene images taken by the optical imaging system are displayed on a display device for a predetermined period of time in response to insertion of a coin. It therefore permits two or more persons to view a scene simultaneously. The optical apparatus is also provided with excellent functional features that optimize its operability. For example, it has an optical imaging system equipped with a zooming system and is provided with an operating system that the user can use to operate the zooming system from the exterior. The user can therefore easily locate the scene or object to be viewed at a low magnification and then view it at a high magnification. When not in use by a user (when no coin has been inserted), the optical apparatus can be used to display a predetermined image taken and recorded beforehand. For instance, until activated by insertion of a coin, it can be used to display tourist information or the like stored in the image file device. This further enhances the utility of the optical apparatus.

According to another aspect of the present invention, an optical apparatus comprises an optical imaging system, an image pickup device for capturing an image focused by the optical imaging system, display means for displaying the captured image, means for directionally varying the optical imaging system, storage means for storing captured images taken beforehand within a range of directional variability of the optical imaging system, sensing means for detecting the direction of the optical imaging system, and means responsive to the direction of the optical imaging system detected by the sensing means for reading from the storage means an image obtained in the detected direction and outputting the read-out image to the display means for display thereof.

In an optical apparatus according to the present invention, an image from the storage means is displayed on the display means for display in place of an image actually being taken by the optical imaging system.

An optical apparatus according to the present invention is preferably provided with means responsive to insertion of a coin for causing images to be displayed on the display means for a predetermined period of time.

An optical apparatus according to the present invention is preferably further provided with a system for zooming the optical imaging system and varying a magnification of a read-out image in proportion to a magnification of the optical imaging system.

In an optical apparatus according to the present invention, the stored images are images taken at different times of the day and seasons of the year and an image from among the stored images is selected and read-out for display thereof.

In the optical apparatus in the present invention, scene images that can be taken by its optical imaging system are stored in advance in storage means, and an image corresponding to the current direction of the optical imaging system is read from the storage means and displayed on display means. It therefore enables the user to observe a simulated image or a model image corresponding to the real-time image actually being taken by the optical imaging system. Therefore, even if the scene or object desired to be viewed cannot be clearly seen due to clouds or haze, the user can locate the desired scene or object from the model image and quickly aim the optical system in that direction.

Moreover, the optical apparatus according to the present invention enables the user to select from among various model images. Therefore, assuming for example that it is now an afternoon in summer, the user is able to observe not only the current real-time scene but also the same scene as it would be seen in winter, in the morning or under ideal viewing conditions with no mist, fog or haze. The user is therefore readily able to enjoy various simulated (virtual) experiences.

BRIEF DESCRIPTION OF THE DRAWINGS

The purposes and features of the present invention will become more apparent from a consideration of the following detailed description taken in conjunction with the accompanying drawings in which.

DESCRIPTION OF THE PREFERRED EMBODIMENT

Figure 1A:
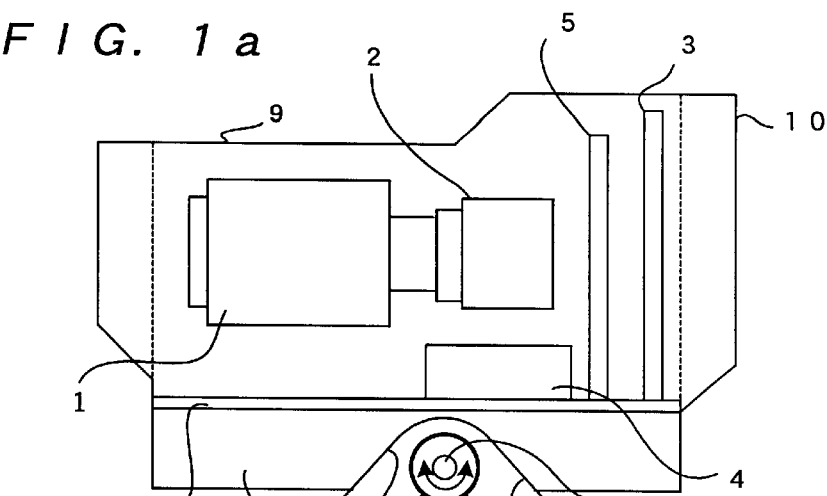
FIG. 1a is a side view showing the internal arrangement of an optical apparatus according to the present invention.

The invention will now be described in detail on the basis of the preferred embodiment illustrated in the drawings.

Figure 1C:
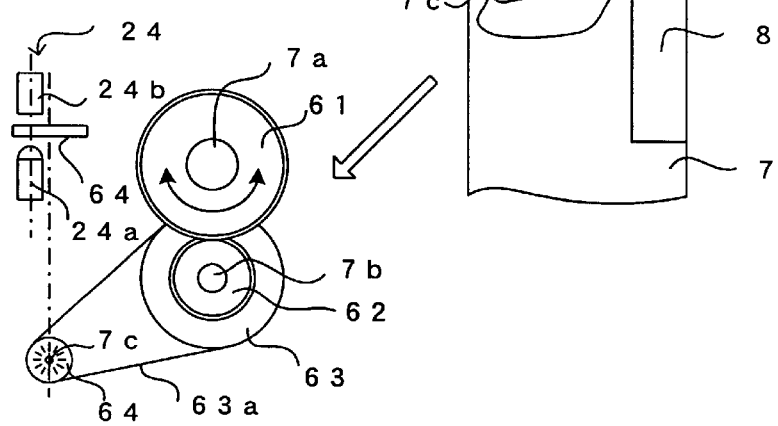
FIG. 1b is a front view of the optical apparatus shown in FIG. 1a, and FIG. 1c is an explanatory view showing in detail a mechanism for detecting the elevation angle and depression angle of the optical system of the same optical apparatus.
Figure 1B:
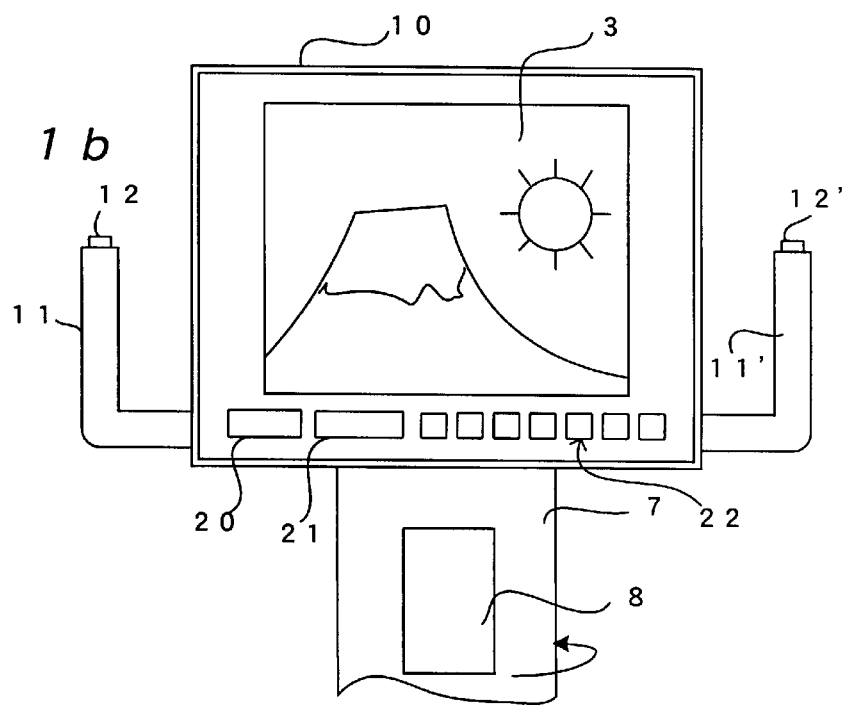
Figure 2:
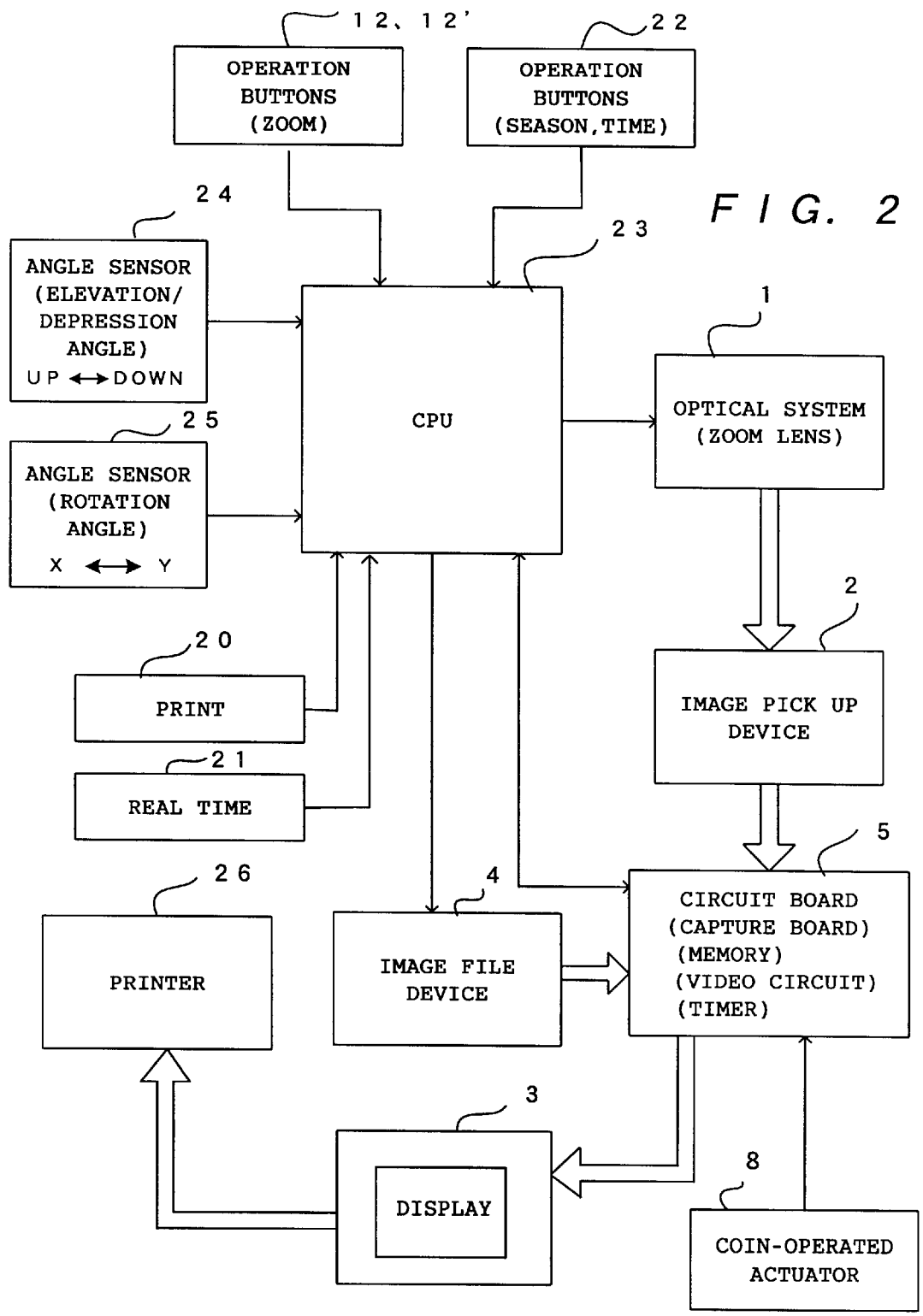
FIG. 2 is a block diagram showing the arrangement of the optical apparatus of FIG. 1.

FIGS. 1 and 2 show the arrangement of an optical apparatus according to one embodiment of the present invention. The optical apparatus includes an optical imaging system 1 such as a zoom lens, an image pickup device 2 such as a CCD (charge-coupled device) camera for capturing the image focused by optical system 1, and a display device 3 such as an LCD (liquid crystal device) or a CRT (cathode ray tube) for displaying the image. The display device 3 is mounted on a base plate 6. An image file device 4, which may be a hard disk or the like, and a circuit board 5 are also mounted on the base plate 6. All of the foregoing components are enclosed by a cover of the main optical apparatus unit 9. A hood 10 is attached to surround the display device 3 so as to shield the displayed image from external light and to make it difficult for bystanders to view the image. A base section 60 of the main optical apparatus unit 9 is supported on a shaft 7a pivotably mounted on a post 7 by bearings. The main optical apparatus unit 9 can therefore be swung about the shaft 7a vertically with respect to the post 7 by operating handles 11, 11'. This enables adjustment of the elevation angle (up angle) and depression angle (down angle) of the optical system 1.

As shown in the enlarged view of FIG. 1c, a gear 61 is fixed on the shaft 7a so as to mesh with a gear 62 rotatably mounted on a shaft 7b fixed on the post 7. A belt pulley 63, which is unitary with the gear 62, is also rotatably mounted on the shaft 7b. A slit disk 64 is rotatably mounted on a shaft 7c also fixed on the post 7. A belt 63a is wound around the belt pulley 63 and the slit disk 64. When the main optical apparatus unit 9 is swung vertically about the shaft 7a, the rotation of the gear 61 this produces is therefore transmitted through the gear 62, the belt pulley 63 and the belt 63a to rotate the slit disk 64. As shown in the inset in FIG. 1c, the slit disk 64 is disposed between a light emitter 24a and a light receiver (encoder) 24b of an angle sensor 24. When the slit disk 64 rotates, the angle sensor 24 successively detects the slits by the light passing therethrough. The angle sensor 24 is therefore able to detect the amount of rotation of the slit disk 64 and thus the elevation angle or depression angle of the optical system 1. A signal representing the detected angle is sent to a CPU (central processing unit) 23 shown in FIG. 2.

The post 7 is constructed so that it can be rotated as a whole about its vertical axis. The left and right handles 11, 11' are fixed on the post 7. By operating the handles 11, 11', the entire optical apparatus can be rotated about the vertical axis of the post 7 either counterclockwise (as viewed from above; defined as the X direction) or clockwise (Y direction). The angle of rotation is detected by an angle sensor 25 shown in FIG. 2 and sent to the CPU 23. As the angle sensor 25 can be structured in substantially the same way as the angle sensor 24, the details thereof are not shown in FIG. 1. Specifically, the angle of rotation can be detected by detecting the amount of rotation of the optical apparatus about the vertical axis of the post 7 using a slit disk rotated by a gear and belt transmission mechanism like that shown in FIG. 1c.

Buttons 12, 12' are provided at the tips of the handles 11, 11' and are linked with the CPU 23 to enable zooming of the optical system 1 so as to change the magnification. Zooming control can, for instance, be arranged so that the CPU 23 responds to a signal received from the button 12 (left side) to zoom the optical system 1 in the direction of increasing magnification and responds to a signal from the button 12' to zoom it in the direction of decreasing magnification.

A row of various operating buttons is provided under the display device 3. Button 20 is a print button. When pressed, the CPU 23 responds to the signal produced to operate a printer 26 and print the image displayed on the display device 3. Button 21 is a real-time button. When pressed, the CPU 23 responds to the signal produced to send the real-time image obtained by the image pickup device 2 via the optical system 1 to a capture port of the circuit board 5 for display on the display device 3.

Figure 3:
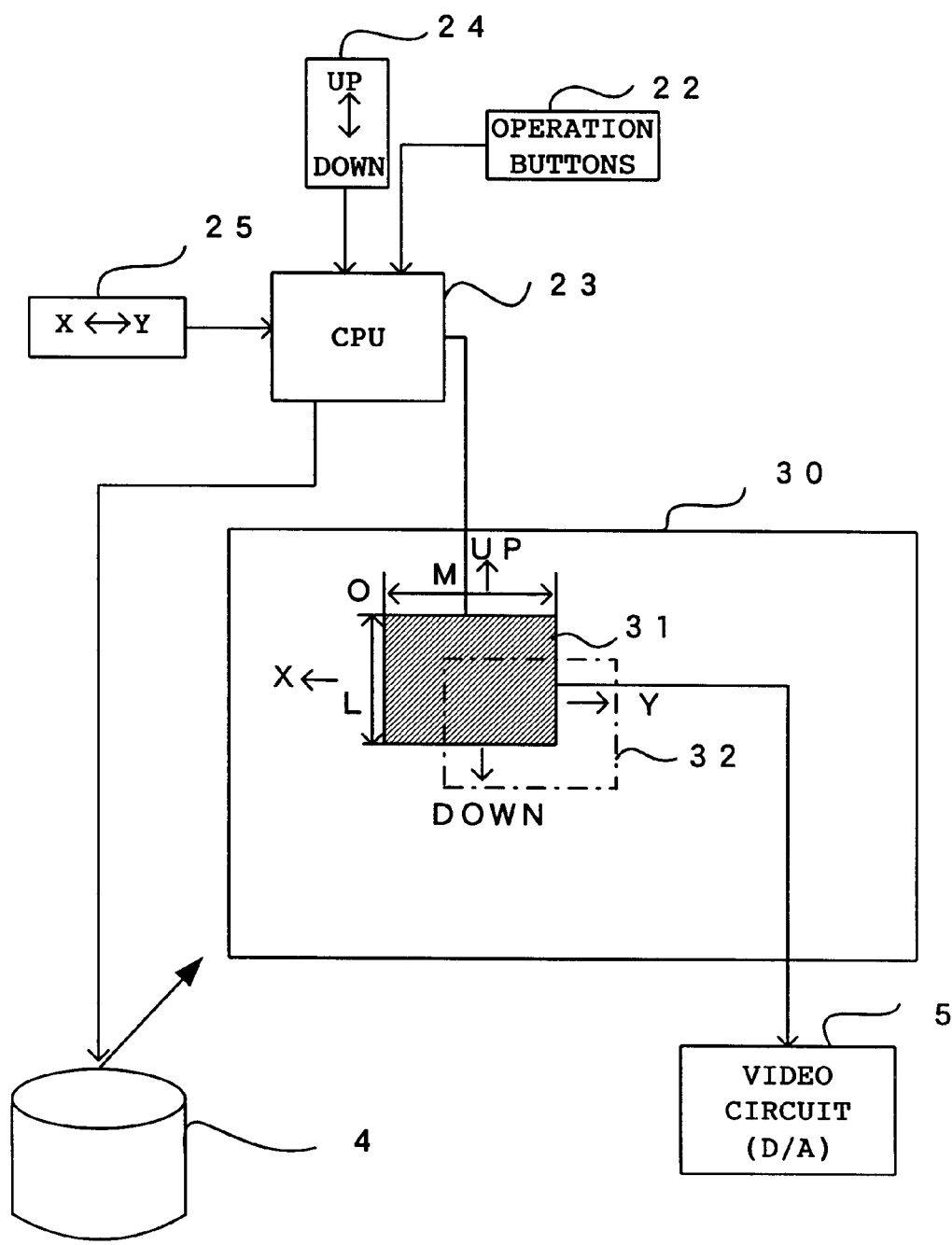
FIG. 3 is an explanatory diagram showing how an image is read from an image file device and displayed.

Operating buttons 22 are for selecting an operating mode for the season of the year (spring, summer, autumn or winter) and the part of the day (morning, afternoon or night). As shown in FIG. 3, when "spring" and "morning" are pressed, for example, an image obtained beforehand in that mode is transferred from the image file device 4 to the total memory space 30 of the circuit board memory. This image includes all scenes that can be viewed by swinging the optical apparatus between its upper and lower limits and rotating it as far as possible in the X-Y direction, namely, an image encompassing all scenes viewable in every direction in which the optical system 1 can be pointed. Such an image is taken in advance at the lowest magnification for every mode, i.e., every combination of season and part of the day, and stored in the image file device 4 in association with the mode concerned. The images for the individual modes are read from the image file device 4 in response to the mode designated by operation of the buttons 22.

The CPU 23 uses the encoder values received from the encoders of the angle sensors 24 and 25 to calculate the address corresponding to the angular position O, adds thereto the vertical direction address L and the X-Y direction address M at the display limits of the display device 3 to determine the address space 31, accesses the address space 31 to acquire the image data recorded therein, and sends the data to a video circuit of the circuit board 5, which displays it on the display device 3. When the optical apparatus is swung about the shaft 7a or rotated clockwise or counterclockwise, the angular position O moves to the new angular position detected by the angular sensors 24 and 25. Thus, as indicated by the broken line 32, a scene at a different location is displayed on the display device 3. The operator (user) therefore views a model scene (simulated scene) adjusted for the selected season and part of day and corresponding to the real-time scene being acquired by the optical apparatus at the vertical and X-Y position to which it has been rotated (pointed).

A coin-operated actuator 8 is installed in the post 7. Insertion of a coin (or coins of a specified value) in the coin-operated actuator actuates a timer provided in the circuit board 5. This causes the real-time image from the image pickup device 2 or a simulated image of one of the various modes read from the image file device 4 to be displayed on the display device 3 for a predetermined period of time. When no coin has been inserted, an image stored in the image file device 4 is displayed on the display device 3. The content of the image displayed at this time can, for instance, be local tourist information or an advertisement/commercial (still or moving). As used herein, the phrase "coin-operated means any type of payment means including, without limitation, coin acceptators, bill validators, credit/debit card readers and any other type of suitable payment means.

Figure 4:
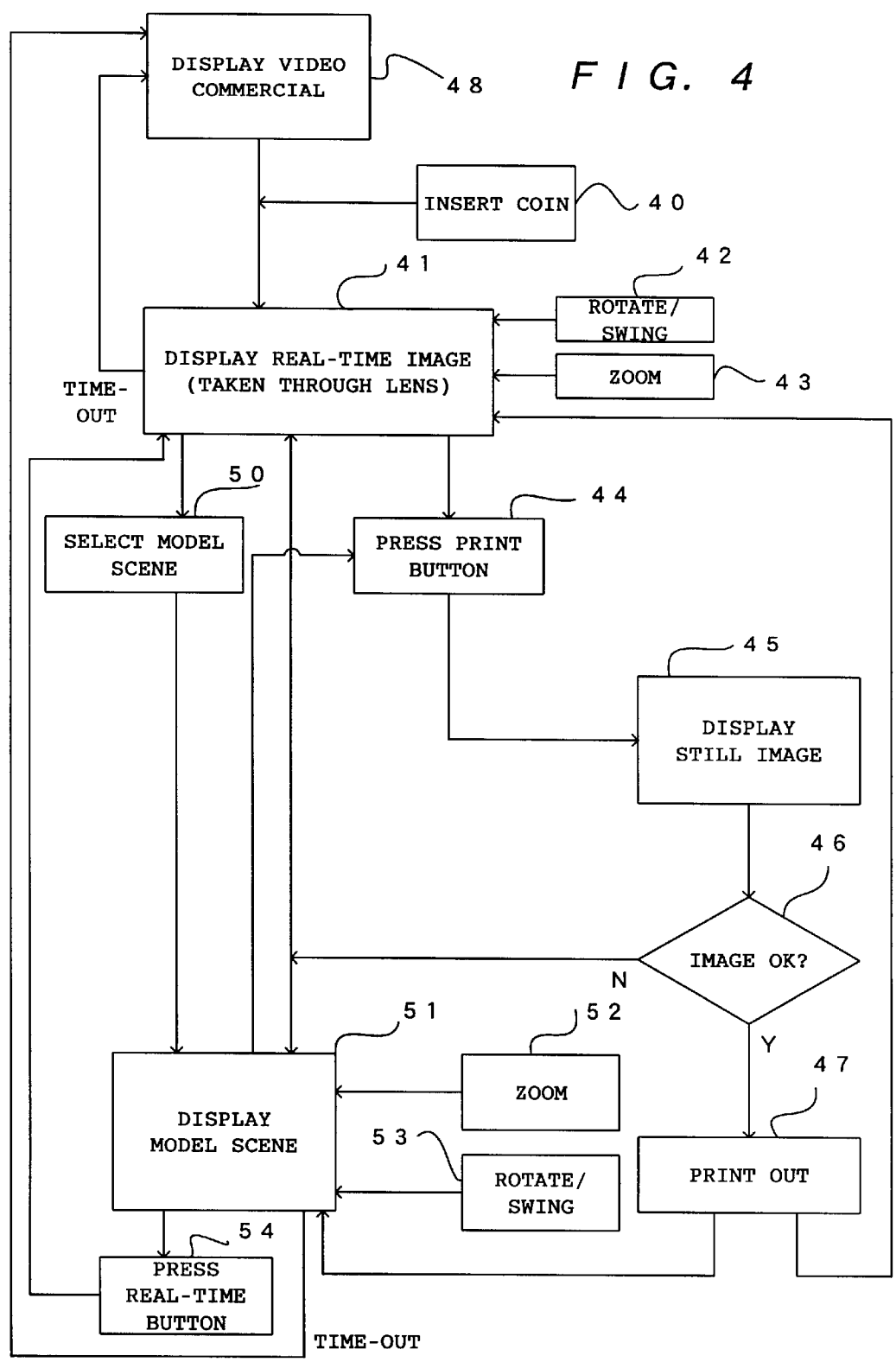
FIG. 4 is a flow diagram showing the flow of operations during use of the optical apparatus according to the present invention.

The optical apparatus can, for example, be installed at a scenic spot frequented by tourists or at some other location where visitors often want a closer view. To view the surrounding scenery or get a close-up view with the optical apparatus according to the invention, the user inserts the specified coin or coins in the coin-operated actuator 8 as indicated at step 40 of FIG. 4. The coin-operated actuator 8 then sends a signal to the circuit board 5 to actuate the timer and display an image of the scene or object picked up by the image pickup device 2 through the zoom lens of the optical system 1 on the display device 3 in real time for a predetermined period of time (step 41). If a different magnification is desired, the viewer can freely zoom in or out by operating the zoom buttons 12, 12' at the ends of the handles 11, 11' (step 43). To view a different scene or object, the user operates the handles 11, 11' to swing the optical axis of the optical apparatus (step 42) and direct the zoom lens in the direction of the next scene or object to be viewed. At this time, the next scene or object can be easily found by first zooming out, then swinging the optical apparatus in the general direction of the next view desired, and finally zooming in to observe details.

The real image captured through the optical system and displayed on the display device 3 can thus be simultaneously viewed by a party of two or more people. On the other hand, the presence of the hood 10 prevents persons who are not members of the party from viewing images without inserting a coin.

The user can obtain a print of the image displayed on the display device 3 by pressing the print button 20 (step 44). This displays a still image (step 45) and if the user indicates that it is satisfactory (step 46), the image is output to the printer 26 (step 47). If the image is not what the user wants, the program goes back to step 41 to enable selection of another image by repeating the foregoing loop.

Upon the passage of the predetermined period of time, the optical apparatus times out and an advertisement/commercial or the like is displayed on the display device 3 (step 48).

On the other hand, if, while a real-time image from the optical imaging system 1 is being displayed, the user selects a model scene of a desired mode by pressing a combination of the buttons 22 (step 50), e.g., if the user presses the "spring" and "morning" buttons, image data of the same scene obtained on a morning in spring are transferred from the image file device 4 to the total memory space 30. As shown in FIG. 3, image data over an address space of predetermined length from the address detected by the angular sensors 24 and 25 at this time are displayed on the display device 3 instead of the real-time image actually being taken by the optical imaging system (step 51). The user can thus view a model scene. If the user operates the zoom buttons (step 52), the magnification of the model scene is varied in direct proportion to the zooming. If the user changes the direction of the optical system (step 53), another model scene is displayed that corresponds to the new direction detected by the angular sensors 24 and 25. The user can also print out the model image by pressing the print button 20 (steps 44 to 47).

If, while a model scene is being displayed, the user presses the real-time button 21 (step 54), the real-time image actually being taken by the optical imaging system is displayed again instead of the model scene (step 41). When the predetermined time period expires while a model image is being displayed, a video commercial, for example, is displayed (step 48), in the same manner as when time runs out during display of a real-time image.

In this embodiment, the model scene is displayed in place of the real-time scene actually being taken by the optical imaging system. Instead, the real-time and model scenes can be displayed alternately in succession. It is also possible to split the screen and simultaneously display the real-time and model scenes side by side. The user may find this more fascinating because it allows him or her to compare the simultaneously displayed real-time and simulated scenes.

What is claimed is:

1. A coin-operable optical viewing apparatus fixedly mountable at a given location to permit users to view scenery in the vicinity of the location at a desired magnification by tendering a predetermined monetary amount, comprising: a support fixedly mountable to a structure at the given location; an optical imaging system pivotably mounted to the support for focusing on a desired object or scenery in the vicinity of the location; an image pickup device for capturing an image focused by the optical imaging system; a display device for displaying the captured image on a display screen viewable by multiple persons simultaneously; a zooming system for zooming the optical imaging system, the zooming system being operable by means of a control member mounted externally of the optical imaging system to permit desired magnification of the displayed image; and means responsive to payment by the user for outputting and displaying the captured image on the display screen for a predetermined period of time.

2. A coin-operable optical viewing apparatus according to claim 1; further comprising a demonstration image display system for storing one or more images and displaying the stored images on the display screen until a coin is inserted.

3. A coin-operable optical viewing apparatus according to claim 1; further comprising a printer for printing an image displayed on the display screen.

4. An optical viewing apparatus comprising: an optical imaging system mounted at a given location to permit users to view objects or scenery in the vicinity of the given location; an image pickup device for capturing an image focused by the optical imaging system; display means for displaying the captured image; means for varying the orientation of the optical imaging system so that users may focus on different objects or scenery in the vicinity of the given location; storage means for storing a plurality of pre-stored images comprising images of objects or scenery in the vicinity of the given location within a field of view and a range of different orientations of the optical imaging system such that the plurality of pre-stored images correspond to images that are actually focused by the optical imaging system and captured by the image pickup device; sensing means for detecting the orientation of the optical imaging system; and control means responsive to the orientation of the optical imaging system detected by the sensing means for reading from the storage means a pre-stored image of objects or scenery in the vicinity of the given location and corresponding to the detected orientation of the optical imaging system, and outputting the read-out image to the display means for display thereof.

5. An optical apparatus according to claim 4; wherein the control means includes means for displaying an image from the storage means on the display means instead of an image actually being taken by the optical imaging system so that a displayed image of a scene being viewed by a user is not the image focused on by the optical imaging means but a pre-stored image of the same scene.

6. An optical apparatus according to claim 4; further comprising means responsive to the tender of payment by a user for causing images to be displayed on the display means for a predetermined period of time.

7. An optical apparatus according to claim 4; further comprising a system for zooming the optical imaging system and varying a magnification of a read-out image in proportion to a magnification of the optical imaging system.

8. An optical apparatus according to claim 4; wherein the pre-stored images comprise images of objects or scenery in the vicinity of the optical imaging system taken by the optical imaging system at different orientations thereof and taken at different times of the day and seasons of the year.

9. An optical apparatus comprising: an optical imaging system; an image pickup device for capturing an image focused by the optical imaging system; display means for displaying the captured image; means for varying the orientation of the optical imaging system; storage means for storing a plurality of pre-stored images comprising captured images taken by the optical imaging system throughout a range of directional variability of the optical imaging system; sensing means for detecting the orientation of the optical imaging system; means responsive to the orientation of the optical imaging system detected by the sensing means for reading from the storage means a pre-stored image obtained beforehand in the detected orientation and outputting the read-out image to the display means for display thereof; and means for selecting one or both of an image currently being taken by the optical imaging system and a pre-stored image from the storage means corresponding to the image currently being taken by the optical imaging system for display on the display means.

10. An optical apparatus according to claim 9; further comprising means responsive to the tender of payment by a user for causing the images to be displayed on the display means for a predetermined period time.

11. An optical viewing apparatus comprising: a support fixedly mountable at a given location; an image pickup device pivotably mounted to the support for focusing on a desired object or scenery in the vicinity of the given location and capturing an image of the focused object or scene; a display device for displaying the captured image; a memory for storing a plurality of pre-stored images of objects or scenery in the vicinity of the given location each taken at a different orientation of the image pickup device; means for retrieving the pre-stored images and displaying the pre-stored images on the display device; detecting means for detecting the orientation of the image pickup device; and control means responsive to the detected orientation for reading from the memory a pre-stored image corresponding to the detected orientation and outputting the read-out, pre-stored image for display thereof on the display device.

12. An optical viewing apparatus according to claim 11; further comprising means responsive to the tender of payment by a user for displaying on the display device images of an object or scene captured by the image pickup device for a predetermined period of time.

13. An optical viewing apparatus according to claim 12; wherein the means for retrieving and displaying the pre-stored images includes means for displaying one or more pre-stored images on the display device until payment is received.

14. An optical viewing apparatus according to claim 11; further comprising a zooming system for controlling the image pickup device to vary the magnification of an image and having a manually operable control member.

15. An optical viewing apparatus according to claim 11; further comprising a printer for printing an image displayed on the display device.

16. An optical viewing apparatus according to claim 11; wherein the means for retrieving and displaying the pre-stored images includes means for displaying a pre-stored image from the memory instead of an image currently being taken by the image pickup device so that the displayed image of an object or scenery being viewed by a user is not the image focused on by the image pickup device but a pre-stored image of the same object or scenery.

17. An optical viewing apparatus according to claim 11; wherein the pre-stored images comprise images of the scenery in the vicinity of the optical imaging system at different orientations of the image pickup device and taken at different times of the day, different seasons of the year, and different weather conditions.

18. An optical observation apparatus comprising: an optical camera mountable at a given location for capturing images of objects and scenery in the vicinity of the given location; a display for displaying the captured images; a support for pivotably supporting the optical camera so that the orientation of the optical camera may be varied and images of different objects and scenery in the vicinity of the given location may be captured; a memory for storing a plurality of pre-stored images comprising images of objects and scenery in the vicinity of the given location taken by and at a range of different orientations of the optical camera; a detector for detecting the orientation of the optical camera; and means responsive to the detected orientation of the optical camera for reading from the memory a pre-stored image corresponding to the detected orientation and outputting the read-out image to the display.

* * * * *